US012807169B2

(12) United States Patent
Yoshizawa

(10) Patent No.: US 12,807,169 B2
(45) Date of Patent: Nov. 24, 2026

(54) CONTROL APPARATUS FOR VEHICLE

(71) Applicant: SUBARU CORPORATION, Tokyo (JP)

(72) Inventor: Satoshi Yoshizawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 1139 days.

(21) Appl. No.: 16/750,280

(22) Filed: Jan. 23, 2020

(65) Prior Publication Data

US 2020/0307618 A1 Oct. 1, 2020

(30) Foreign Application Priority Data

Mar. 25, 2019 (JP) ................................ 2019-056865

(51) Int. Cl.
*B60W 50/14* (2020.01)
*B60C 23/04* (2006.01)
(Continued)

(52) U.S. Cl.
CPC ......... *B60W 50/14* (2013.01); *B60C 23/0488* (2013.01); *B60W 30/18172* (2013.01); *B60W 40/06* (2013.01); *G01M 17/02* (2013.01)

(58) Field of Classification Search
CPC ........... B60W 50/14; B60W 30/18172; B60W 40/06; B60W 2520/26; B60W 2520/105; B60W 10/08; B60W 2040/1307; B60W 2420/10; B60W 2420/403; B60W 2422/70; B60W 2520/00; B60W 2520/10; B60W 2520/125; B60W 2530/20; B60W 2540/10; B60W 2540/18; B60W 2540/215; B60W 2552/40; B60W 2710/0666; B60W 2710/0672; B60W 2710/085;
(Continued)

(56) References Cited

U.S. PATENT DOCUMENTS 3,611,284 A * 10/1971 Lewis .................. B60T 8/3635
188/2 A
5,602,524 A 2/1997 Mock et al.
(Continued)

FOREIGN PATENT DOCUMENTS

JP H036794 U 1/1991
JP 4-331336 A 11/1992
(Continued)

OTHER PUBLICATIONS

Japanese Office Action with Machine Translation mailed Jun. 21, 2022 in Application No. 2019056865.

*Primary Examiner* — Adam D Tissot
*Assistant Examiner* — Aarron E Santos
(74) *Attorney, Agent, or Firm* — Troutman Pepper Locke LLP

(57) ABSTRACT

A control apparatus for a vehicle includes tire-force sensors, a tire-force estimator, and a notification unit. The tire-force sensors are provided on respective wheels of the vehicle. The tire-force estimator is configured to estimate tire forces of the respective wheels on the basis of sensor signals outputted from the respective tire-force sensors. The notification unit is configured to inform, on the basis of the estimated tire forces, a driver of the vehicle about a position of any of the wheels determined to be in a limit state.

13 Claims, 6 Drawing Sheets

(51) Int. Cl.

| | |
|---|---|
| ***B60W 30/18*** | (2012.01) |
| ***B60W 40/06*** | (2012.01) |
| ***G01M 17/02*** | (2006.01) |

(58) Field of Classification Search

CPC ......... B60W 2720/106; B60W 40/068; B60W 50/10; B60W 50/12; B60C 23/0488; G01M 17/02

USPC ............................................................ 701/36

See application file for complete search history.

(56) References Cited

U.S. PATENT DOCUMENTS

| | | | | |
|---|---|---|---|---|
| 6,614,343 | B1 | 9/2003 | Fennel et al. | |
| 2003/0141967 | A1* | 7/2003 | Aichi ..................... | B60N 2/879 340/945 |
| 2004/0178893 | A1* | 9/2004 | Litkouhi .................. | H04R 5/02 340/435 |
| 2005/0222740 | A1 | 10/2005 | Inoue et al. | |
| 2007/0109104 | A1* | 5/2007 | Altan ..................... | B60Q 9/008 340/407.1 |
| 2009/0177346 | A1* | 7/2009 | Hac ....................... | B60W 40/13 701/31.4 |
| 2016/0123866 | A1* | 5/2016 | Leo ........................ | G01N 19/02 73/9 |
| 2019/0263413 | A1* | 8/2019 | Hancock .............. | B60K 17/356 |

FOREIGN PATENT DOCUMENTS

| | | | | | |
|---|---|---|---|---|---|
| JP | H05332889 | A | | 12/1993 | |
| JP | H07507513 | A | | 8/1995 | |
| JP | 108161679 | A | | 6/1996 | |
| JP | 10-318862 | A | | 12/1998 | |
| JP | 2002002472 | A | * | 6/2000 | |
| JP | 2000259243 | A | | 9/2000 | |
| JP | 2001519285 | A | | 10/2001 | |
| JP | 2002-2472 | A | | 1/2002 | |
| JP | 2005329907 | A | | 12/2005 | |
| JP | 4277799 | B2 | | 3/2009 | |
| JP | 2010069984 | A | | 4/2010 | |
| JP | 5239801 | B2 | * | 7/2013 | |
| WO | WO2018029944 | | * | 2/2018 | |
| WO | WO-2018029944 | A1 | * | 2/2018 | ............. B60C 23/00 |

* cited by examiner

CONTROL APPARATUS FOR VEHICLE

CROSS-REFERENCE TO RELATED APPLICATIONS

The present application claims priority from Japanese Patent Application No. 2019-056865 filed on Mar. 25, 2019, the entire contents of which are hereby incorporated by reference.

BACKGROUND

The present disclosure relates to a control apparatus for a vehicle.

Various techniques for controlling a vehicle on the basis of the frictional state of the road surface have been provided. For example, Japanese Unexamined Patent Application Publication No. 2002-002472 proposes a technique for estimating the friction coefficient or the condition of the road surface on which the vehicle is traveling and performing feedback control of the traveling state of the vehicle by using the estimated friction coefficient or the condition of the road surface. The technique enhances the safety of the vehicle.

SUMMARY

An aspect of the technology provides a control apparatus for a vehicle. The apparatus includes tire-force sensors, a tire-force estimator, and a notification unit. The tire-force sensors are provided on respective wheels of the vehicle. The tire-force estimator is configured to estimate tire forces of the respective wheels on the basis of sensor signals outputted from the respective tire-force sensors. The notification unit is configured to inform, on the basis of the estimated tire forces, a driver of the vehicle about a position of any of the wheels determined to be in a limit state.

An aspect of the technology provides a control apparatus for a vehicle. The apparatus includes tire-force sensors and circuitry. The tire-force sensors are provided on respective wheels of the vehicle. The circuitry is configured to estimate tire forces of the respective wheels on the basis of sensor signals outputted from the respective tire-force sensors, and inform, on the basis of the estimated tire forces, a driver of the vehicle about a position of any of the wheels determined to be in a limit state.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

A tire of a vehicle in a traveling state may possibly slip when the force generated at the tire exceeds a limit. The force generated at the tire may also be referred to as "tire force" in the description below. It is presumed that, if the driver can be preliminarily informed about the position of the tire in which the tire force is approaching the limit, the driver would be able to respond in a way that avoids slipping.

However, when the vehicle is traveling while the tire force is near the limit, the driver presumably concentrating on driving may find it difficult to readily perceive which tire is approaching the limit of the tire force through a warning display. If the driver views the display and perceives that the tire force is approaching the limit, the vehicle movement may be disrupted at that point of time.

It is desirable to provide a control apparatus for a vehicle that is able to inform the driver in a short time about the position of the tire which is approaching a limit of the tire force.

First Embodiment

Configuration Example of Vehicle

Figure 1:
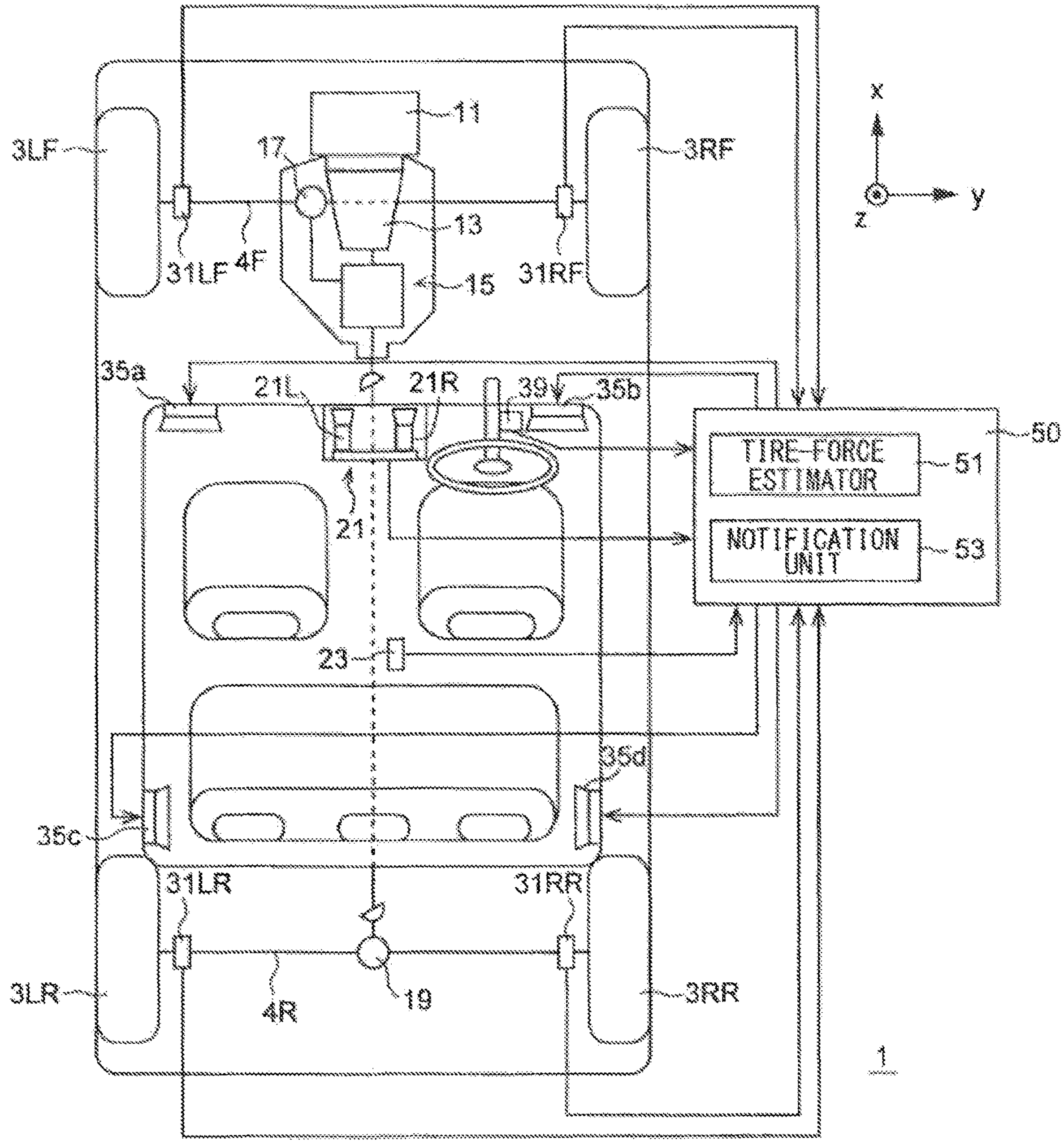
FIG. 1 illustrates a configuration example of a vehicle equipped with a control apparatus for the vehicle according to one example embodiment of the technology.

The configuration of a vehicle 1 according to an embodiment will now be described with reference to FIG. 1. FIG. 1 illustrates a configuration example of the vehicle 1 according to the embodiment.

The vehicle 1 illustrated in FIG. 1 may be a four-wheel-drive vehicle having four driven wheels 3. The four wheels 3 may consist of a left front wheel 3LF, a right front wheel 3RF, a left rear wheel 3LR, and a right rear wheel 3RR. The vehicle 1 may include an internal combustion engine 11. The power of the internal combustion engine 11 may be transferred to the two axels 4 via an automatic transmission 13, a center differential device 15, a front differential device 17, and a rear differential device 19, etc. The two axels 4 may consist of a front wheel axel 4F and a rear wheel axel 4R.

The power of the internal combustion engine 11 transferred to the front wheel axel 4F and the rear wheel axel 4R may apply a drive torque to the four wheels 3, to drive the respective wheels 3.

In the coordinate system of the vehicle 1 illustrated in FIG. 1, the forward traveling direction of the vehicle 1 may be defined as the x-axis direction, and the left-right direction of the vehicle 1 may be defined as the y-axis direction. The vertical direction of the vehicle 1 may be defined as the z-axis direction. The acceleration direction of the vehicle 1 may be represented as a positive direction along the x axis. The rightward direction may be represented as a positive direction along the y axis. The upward direction may be represented by a positive direction along the z axis.

The axels 4 near the wheels 3 may be provided with four tire-force sensors 31. The tire-force sensors 31 may consist of tire-force sensors 31LF, 31RF, 31LR, and 31RR. The tire-force sensors 31 may each detects a tire force that acts on the corresponding wheel 3. The tire force may be detected as a front-rear force component Fx, a lateral force component Fy, and a vertical force component Fz.

The front-rear force component Fx may be a component of a frictional force generated at the ground contact face of a tire covering the outer circumference of the wheel 3 in a direction parallel to the central plane of the wheel 3, i.e., the x-axis or front-rear direction. The lateral force component Fy may be a component of the force in a direction orthogonal to the central plane of the wheel 3, i.e., the y-axis or lateral direction. The vertical force component Fz may be the vertical load acting in the vertical or z-axis direction. Note that the central plane of the wheel 3 may be orthogonal to the corresponding axel 4 and pass through the center of the wheel 3 in the width direction.

The tire-force sensors 31 may be appropriate sensors capable of detection of forces acting on the tires of the wheels 3. For example, the stress generated at the wheels 3 may be proportional to the forces acting on the tires of the wheels 3. Thus, the tire-force sensors 31 may be sensors capable of detecting the stress generated in the x-, y-, and z-axis directions of the wheels 3. The stress generated in the x-, y-, and z-axis directions respectively correspond to the front-rear force component Fx, the lateral force component Fy, and the vertical force component Fz. In this embodiment, the detected values of the front-rear force component Fx and the lateral force component Fy are used, for example.

The tire-force sensors 31 may each have a configuration described in, for example, Japanese Unexamined Patent Application Publication No. H04-331336 and No. H10-318862, and Japanese Patent No. 4277799.

In addition to the tire-force sensors 31, a state-quantity sensor 23 and a steering-angle sensor 39 may also be disposed in the vehicle 1. The state-quantity sensor 23 may detect a vehicle state quantity. The vehicle state quantity may be information on the state of the vehicle 1, such as velocity V, lateral acceleration ay, and yaw acceleration ω. The steering-angle sensor 39 may detect an operational state quantity. The operational state quantity may be information on the operational state of the driver, such as a steering angle θ. The state-quantity sensor 23 may include a known velocity sensor, a known lateral accelerometer, or a known yaw accelerometer, etc. Alternatively, the state-quantity sensor 23 may include at least one sensor the comprehensively detects the various quantities.

The vehicle 1 may include an image capturing device 21 that captures images of the front view from the vehicle 1. The image capturing device 21 may include two cameras 21L and 21R, and a signal processing circuit (not illustrated) that processes the image data acquired by the cameras 21L and 21R and generates output data. The vehicle 1 may further include, for example, at least one sensor that detects information on the surroundings of the vehicle 1. Examples of such a sensor may include an ultrasonic sensor, a laser sensor, and an image capturing device.

The detection signals from the tire-force sensors 31, the state-quantity sensor 23, the steering-angle sensor 39, the image capturing device 21, etc., may be received by an electronic control unit 50. The electronic control unit 50 may be coupled to other electronic control units (not illustrated), such as an engine control unit, a transmission control unit, and a brake control unit. The electronic control units may be coupled to each other via a communication bus, such as a control area network (CAN). The electronic control units may each include a microcomputer. The electronic control unit 50 may receive information on the drive torque, braking torque, etc., of the vehicle, from any of the other electronic control units.

For example, the engine control unit may control the internal combustion engine 11 and estimate the engine torque on the basis of the rotating speed of the internal combustion engine 11, the opening of the throttle valve, the fuel injection volume, the ignition timing, the water temperature, and the oil temperature. The transmission control unit may control the automatic transmission 13 and acquire an estimated value of the engine torque from the engine control unit. The transmission control unit may estimate the driving torque applied to each wheel 3 or the driving force of the surface of each tire on the basis of the estimated value of the engine torque, the rotating speed of the internal combustion engine 11, the speed of each wheel 3, the position of the transmission, the engagement force of the clutch, and the slippage of the torque converter, etc. The brake control unit may detect the operated amount of the braking pedal and monitor the rotating speed of each wheel 3 to estimate the braking torque of the wheel 3 or the braking force of the corresponding tire.

The compartment of the vehicle 1 may be provided with four speakers 35. The speakers 35 may consist of speakers 35*a*, 35*b*, 35*c*, and 35*d*. The speaker 35*a* may be disposed in the left front area in the compartment. The speaker 35*b* may be disposed in the right front area in the compartment. The speaker 35*c* may be disposed in the left rear area in the compartment. The speaker 35*d* may be disposed in the right rear area in the compartment. The speakers 35 may generate warning sounds under the control of the electronic control unit 50.

The electronic control unit 50 includes a tire-force estimator 51 and a notification unit 53. For example, a microcomputer or a microprocessor unit may constitute a portion of or the entire electronic control unit 50. Alternatively, updatable firmware or the like may constitute a portion of or the entire electronic control unit 50. Alternatively, a program module executed under an instruction from a central processing unit (CPU) or the like may constitute a portion of or the entire electronic control unit 50.

The electronic control unit 50 may further include a memory device that stores computer programs executed by a microcomputer or the like, various parameters used in arithmetic processing, and information on the result of the processing, etc. The memory device may be a storage element, such as a random-access memory (RAM) or read only memory (ROM), or a storage device, such as a compact disk-read only memory (CD-ROM) or a hard disk drive (HDD).

In the example, the tire-force estimator 51 and the notification unit 53 may be realized by executing computer programs by a microcomputer or the like. The tire-force estimator 51 estimates the tire forces of the wheels 3 on the basis of the sensor signals from the tire-force sensors 31. The notification unit 53 determines whether the wheels 3 are in a limit state on the basis of the estimated tire forces. When the notification unit 53 determines that any of the wheels 3 is in a limit state, the notification unit 53 may execute a warning process of informing the driver of the vehicle 1 about the position of the wheel 3 determined to be in a limit state. Here, the term "limit state" of a wheel 3 may refer to a state in which a wheel 3 is in a domain of possible slipping.

Figure 2:
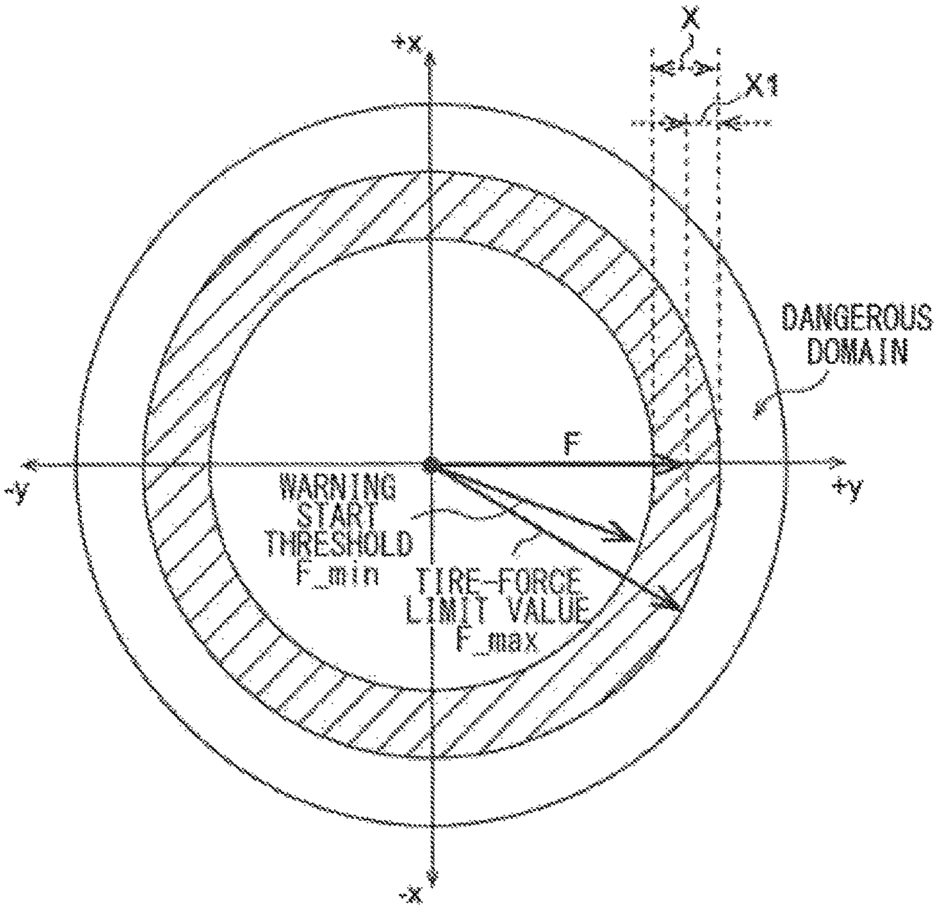
FIG. 2 is a diagram illustrating a limit state of a wheel.

FIG. 2 illustrates a limit state of a wheel 3 using a friction circle. A tire force F may be generated at each wheel 3 while the vehicle 1 is traveling. A positive front-rear force component Fx may be generated during acceleration of the vehicle 1. A negative front-rear force component Fx may be generated during braking of the vehicle 1. A positive or negative lateral force component Fy, as well as the front-rear force component Fx, may be generated during turning of the vehicle 1. The combined force of the front-rear force component Fx and the lateral force component Fy acting on the wheel 3 may be defined as the tire force F. There is a possibility of tire slipping in the dangerous domain in which the tire force F exceeds a tire-force limit value F_max.

The notification unit 53 of the electronic control unit 50 according to the embodiment may execute a warning process of informing the driver about the position of a wheel 3 when the tire force F generated at the wheel 3 exceeds the warning start threshold F_min. For example, the notification unit 53 may control the generation of warning sounds by the speakers 35 disposed in the front, rear, left, and right areas in the compartment so as to change the direction of the warning sounds audible to the driver. In this way, the driver may be informed about the position of the wheel 3 determined to be in a limit state. That is, the notification unit 53 may determine that one of the wheels 3 is in a limit state when the difference X1 (X1=F_max-F) falls below a predetermined threshold, where the difference X1 is the difference between the estimated tire force F of the wheel 3 and the preliminarily defined tire-force limit value F_max. The notification unit 53 may then inform the driver about the position of the wheel 3. The term "predetermined threshold" may refer to the difference X (X=F_max-F_min) between the tire-force limit value F_max and the warning start threshold F_min.

The frictional force that is generated between the tire and the road surface in a traveling state may vary depending on the condition of the road surface. Thus, the tire-force limit value F_max may be established on the basis of the friction coefficient μ of the road surface corresponding to the condition of the road surface. The friction coefficient μ of the road surface may be a predetermined value. Alternatively, the friction coefficient μ may be a value established in accordance with the condition of the road surface estimated on the basis of the detection signals generated by the image capturing device 21 or the state-quantity sensor 23, for example.

For example, the notification unit 53 may determine whether the road on which the vehicle 1 is traveling (hereinafter simply referred to as traveling road) is a paved road or an unpaved road, or whether the road is wet due to rain or frozen due to snow, through a detection signal from the image capturing device 21. The notification unit 53 may also determine the undulations of the road surface through a detection signal from the state-quantity sensor 23. The notification unit 53 may also estimate the surface condition of the traveling road on the basis of the detection signals transmitted from the various sensors and the signals transmitted from in-vehicle devices and external devices, to determine the friction coefficient μ of the road surface.

Figure 3:
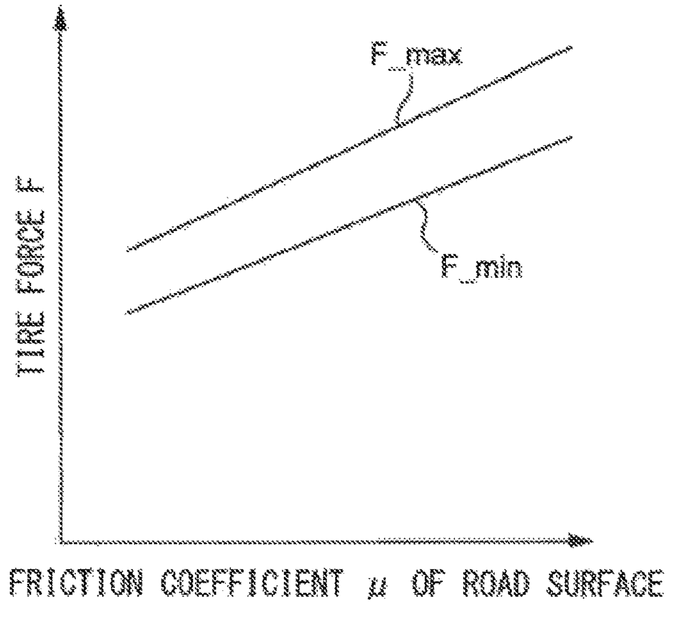
FIG. 3 is a graph illustrating the relation among a friction coefficient of the road surface, a warning start threshold, and a tire-force limit value.

FIG. 3 illustrates the relation among the friction coefficient μ of the road surface, the warning start threshold F_min, and the tire-force limit value F_max. The tire-force limit value F_max and the friction coefficient μ of the road surface may have a proportional relation. For example, the tire-force limit value F_max may be determined by multiplying the friction coefficient μ of the road surface with a predetermined factor. The warning start threshold F_min and the friction coefficient μ of the road surface may also have a proportional relation. For example, the warning start threshold F_min may be determined by multiplying the tire-force limit value F_max with a predetermined factor or value, such as 0.9.

The notification unit 53 may vary at least one of the volume or intervals of the generated warning sounds as the tire force F generated at any of the wheels 3 approaches the tire-force limit value F_max, i.e., in accordance with the level of the limit state. For example, the notification unit 53 may increase the volume or shorten the intervals of the warning sounds as the tire force F generated at the wheel 3 approaches the tire force limit value F_max.

In one example, the notification unit 53 may increase the volume and shorten the intervals of the warning sounds as the difference (X-X1) increases, where the difference (X-X1) is determined by subtracting the difference X1 between the tire-force limit value F_max and the tire force F from the difference X between the tire-force limit value F_max and the warning start threshold F_min. In this way, it is possible to appropriately control the volume and the intervals of the warning sounds even when the tire-force limit value F_max and the warning start threshold F_min vary due to a variation in the friction coefficient μ of the road surface.

In one embodiment of the technology, the four tire-force sensors 31 may serve as "tire-force sensors." In one embodiment of the technology, the tire-force estimator 51 may serve as a "tire-force estimator." In one embodiment of the technology, the notification unit 53 may serve as a "notification unit."

Operation Example of Control Apparatus

Figure 4:
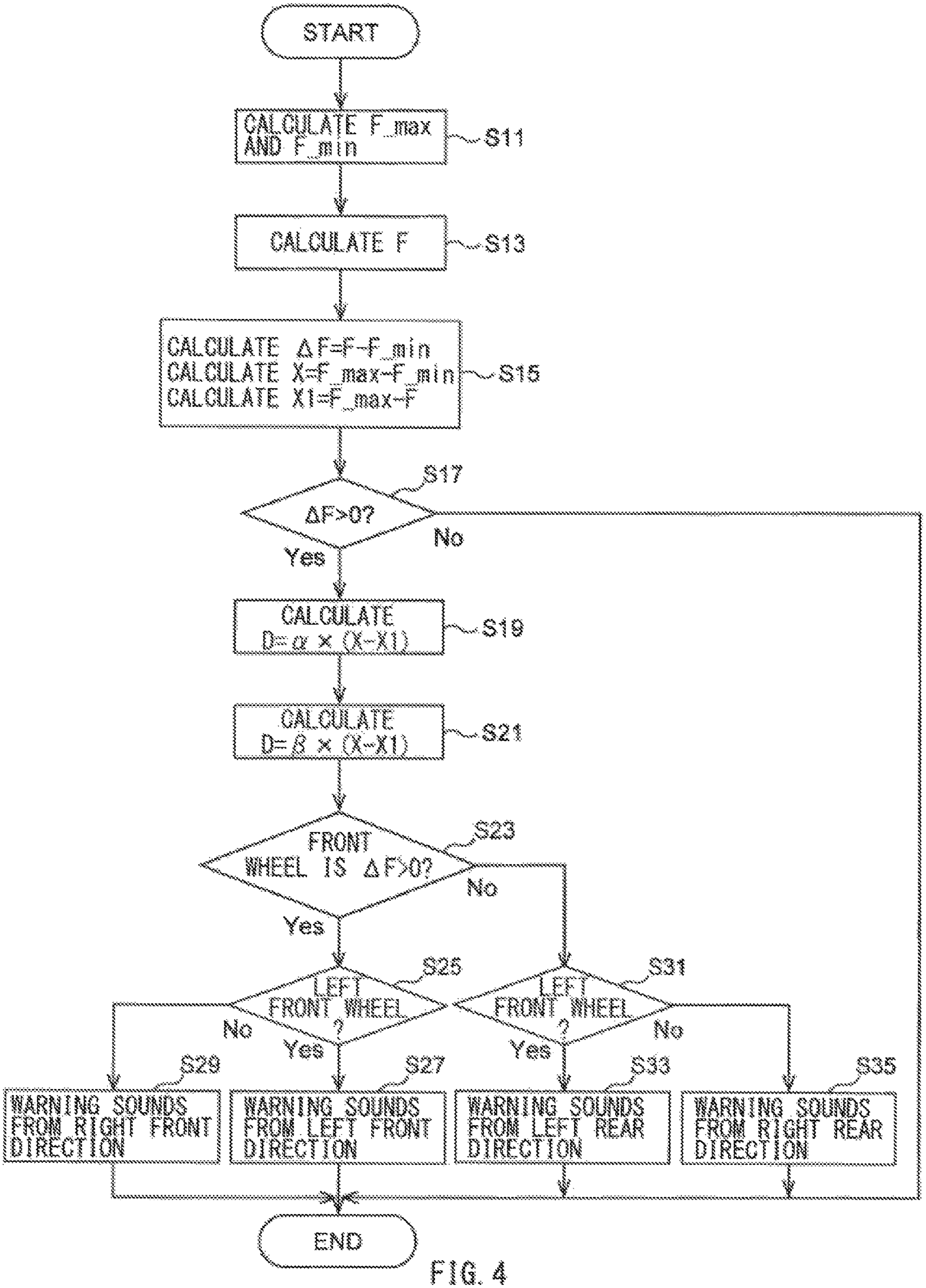
FIG. 4 is a flowchart illustrating a control process executed by the control apparatus for the vehicle according to one example embodiment.

An operation example of the electronic control unit 50 will now be described. FIG. 4 is a flowchart illustrating a control process executed by the electronic control unit 50.

The notification unit 53 of the electronic control unit 50 may calculate the tire-force limit value F_max and the warning start threshold F_min (Step S11). For example, the notification unit 53 may determine the friction coefficient μ of the surface of the traveling road on the basis of a detection signal from the image capturing device 21, a detection signal from the state-quantity sensor 23, and other information that enables estimation of the condition of the road surface. The notification unit 53 may then calculate the tire-force limit value F_max and the warning start threshold F_min by multiplying the friction coefficient μ of the road surface with predetermined factors.

The tire-force estimator 51 of the electronic control unit 50 may calculate the tire forces F generated at the tire of each wheel 3 on the basis of the detection signals from the tire-force sensors 31 of the wheels 3 (Step S13). As described above, the tire force F generated at each wheel 3 may be calculated to be a combined force of the front-rear force component Fx and the lateral force component Fy.

The notification unit 53 then may calculate, for each wheel 3, the difference ΔF between the calculated tire force F and the warning start threshold F_min, the difference X between the tire-force limit value F_max and the warning start threshold F_min, and the difference X1 between the tire-force limit value F_max and the tire force F (Step S15).

The notification unit 53 then may determine whether the calculated difference ΔF is a positive value (Step S17). In Step S17, it may be determined whether the tire force F of each wheel 3 has reached the warning start threshold F_min. If the difference ΔF is not a positive value (Step S17: No), the electronic control unit 50 may cause the main routine to end and the procedure to return to Step S11.

If the difference ΔF is a positive value (Step S17: Yes), the notification unit 53 may calculate the volume D of the warning sounds by multiplying the difference between the differences X and X1 with a predetermined factor α (Step S19). In Step S19, the value of the volume D may increase as the tire force F approaches the tire force limit value F_max. By using the difference between the differences X and X1, it is possible to appropriately control the volume D even when the tire-force limit value F_max varies due to the condition of the surface of the traveling road.

The notification unit 53 then may calculate the intervals t of the warning sounds by multiplying the difference X with a predetermined factor β (Step S21). For example, in Step S21, the intervals t of the warning sounds may decrease as the tire force F approaches the tire-force limit value F_max. By using the difference between the difference X, it is possible to appropriately establish the intervals t of the warning sounds even when the tire-force limit value F_max varies depending on the condition of the surface of the traveling road.

Note that the intervals t of the warning sounds may be varied by varying the temporal length of the warning sounds intermittently generated or the temporal length of the silent periods between the intermittently generated warning sounds. Alternatively, the temporal length of the warning sounds and the temporal length of the silent periods between the warning sounds may both be varied.

The notification unit 53 then may determine whether the wheel 3 in which the tire force F has exceeded the warning start threshold F_min (ΔF>0) is a front wheel (Step S23). If the wheel 3 in which the tire force F has exceeded the warning start threshold F_min is a front wheel (Step S23: Yes), the notification unit 53 may determine whether the wheel 3 is the left front wheel (Step S25).

If the wheel 3 in which the tire force F has exceeded the warning start threshold F_min is the left front wheel (Step S25: Yes), the notification unit 53 may cause warning sounds to be generated at the left front speaker 35*a* in accordance with the volume D established in Step S19 and the intervals t established in Step S21 (Step S27). If the wheel 3 in which the tire force F has exceeded the warning start threshold F_min is not the left front wheel (Step S25: No), the notification unit 53 may cause warning sounds to be generated at the right front speaker 35*b* in accordance with the volume D established in Step S19 and the intervals t established in Step S21 (Step S29).

In Step S23, if the wheel 3 in which the tire force F has exceeded the warning start threshold F_min is not a front wheel (Step S23: No), the notification unit 53 may determine whether the wheel 3 is the left rear wheel (Step S31).

If the wheel 3 in which the tire force F has exceeded the warning start threshold F_min is the left rear wheel (Step S31: Yes), the notification unit 53 may cause warning sounds to be generated at the left rear speaker 35*c* in accordance with the volume D established in Step S19 and the intervals t established in Step S21 (Step S33). If the wheel 3 in which the tire force F has exceeded the warning start threshold F_min is not the left rear wheel (Step S31: No), the notification unit 53 may cause warning sounds to be generated at the right rear speaker 35*d* in accordance with the volume D established in Step S19 and the intervals t established in Step S21 (Step S35).

In this way, the control apparatus according to the embodiment may be able to inform the driver in a short time the position of the tire in which the tire force is approaching a limit. For example, when the tire force F of any one of the wheels 3 exceeds the warning start threshold F_min, the speaker 35 disposed in the position corresponding to the direction of the relevant wheel 3 relative to the position of the driver may generate warning sounds. Thus, the driver may be able to immediately perceive, through auditory perception, the presence of a wheel 3 approaching a slipping limit and the position of the wheel 3. In particular, in situations in which quick maneuvering is required, such as during sport driving, the driver may be able to immediately or intuitively perceive, through sound, the position of the tire in which the tire force is approaching a limit. Thus, it is possible to reduce the idle time that elapses before the driver perceives the presence of a wheel 3 approaching a slipping limit and the position of the wheel 3. In this way, the possibility of slipping is reduced.

Note that in the embodiment described above, the driver may be informed about a specific wheel among the four wheels 3 in which the tire force F has exceeded the warning start threshold F_min. Alternatively, the driver may be informed about whether the wheel 3 in which the tire force F has exceeded the warning start threshold F_min is a front wheel or a rear wheel. In such a case, warning sounds may be generated at the left front speaker 35*a* and the right front speaker 35*b* when the tire force F of the left front wheel 3LF or the right front wheel 3RF exceeds the warning start threshold F_min. Warning sounds may be generated at the left rear speaker 35*c* and the right rear speaker 35*d* when the tire force F of the left rear wheel 3LR or the right rear wheel 3RR exceeds the warning start threshold F_min.

In the embodiment described above, the direction of the warning sounds audible to the driver may be varied in accordance with the position of the wheel 3 determined to be in a limit state. Other than or besides the audible direction of the warning sounds, the type of the warning sounds may be changed. For example, the pitch or the tone of the warning sounds may be varied in accordance with the position of the wheel 3 determined to be in a limit state. Thus, the variation in the pitch or tone of the warning sounds may also enable the driver to immediately perceive, through auditory perception, the presence of a wheel 3 approaching the slipping limit and the position of the wheel 3.

Second Embodiment

A control apparatus for a vehicle according to a second embodiment will now be described. In the first embodiment, warning sounds are used to warn the driver. In the second embodiment, vibration may be used to warn the driver.

Figure 5:
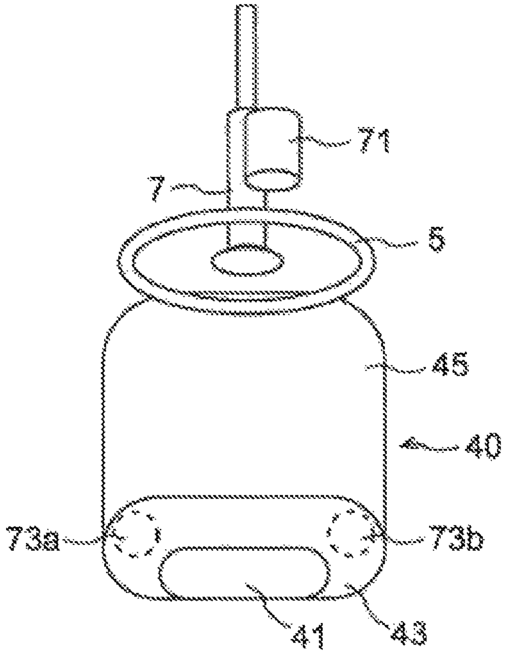
FIG. 5 is a diagram illustrating a configuration example of a control apparatus for a vehicle according to one example embodiment of the technology.
Figure 6:
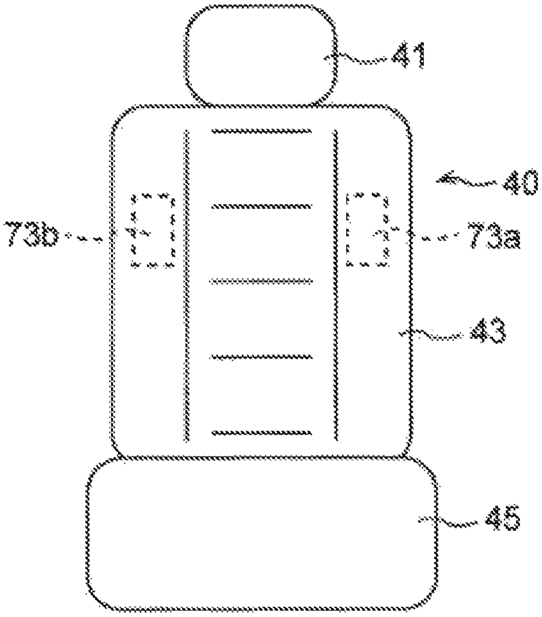
FIG. 6 is a diagram illustrating a configuration example of a control apparatus for a vehicle according to one example embodiment of the technology.

FIGS. 5 and 6 illustrate an example of an oscillator used by a control apparatus for a vehicle according to an embodiment. The control apparatus according to the embodiment may include three oscillators 73 including a first oscillator

73*c*, a second oscillator 73*a*, and a third oscillator 73*b*. Each of the oscillators 73*c*, 73*a*, and 73*b* may include an eccentric motor.

The first oscillator 73*c* may be fixed to a steering column 7 coupled with a steering wheel 5. The first oscillator 73*c* may operate in response to the tire force corresponding to at least one of the left front wheel 3LF or the right front wheel 3RF exceeding a warning start threshold, to warn the driver. The vibration generated by the first oscillator 73*c* may be transmitted to the driver via the steering wheel 5. Since it is difficult to determine the position at which the driver holds the steering wheel 5 while driving, the first oscillator 73*c* may generate vibration without distinguishing between the left and right front wheels, in this embodiment.

The oscillators 73*a* and 73*b* may be disposed on a seat 40 on which the driver sits. The second oscillator 73*a* may be buried in the back part 43 of the seat 40 on the left side. The third oscillator 73*b* may be buried in the back part 43 of the seat 40 on the right side. The second oscillators 73*a* may operate in response to the tire force of the left rear wheel 3LR exceeding the warning start threshold, to warn the driver. The third oscillator 73*b* may operate in response to the tire force of the right rear wheel 3RR exceeding the warning start threshold, to warn the driver.

Alternatively, the second oscillator 73*a* and the third oscillator 73*b* may be buried in the seating part 45 of the seat 40 on the left and right sides.

The basic configuration of the vehicle may be the same as that of the vehicle illustrated in FIG. 1, except for the oscillators. Thus, detailed descriptions of the configuration will not be repeated here.

Figure 7:
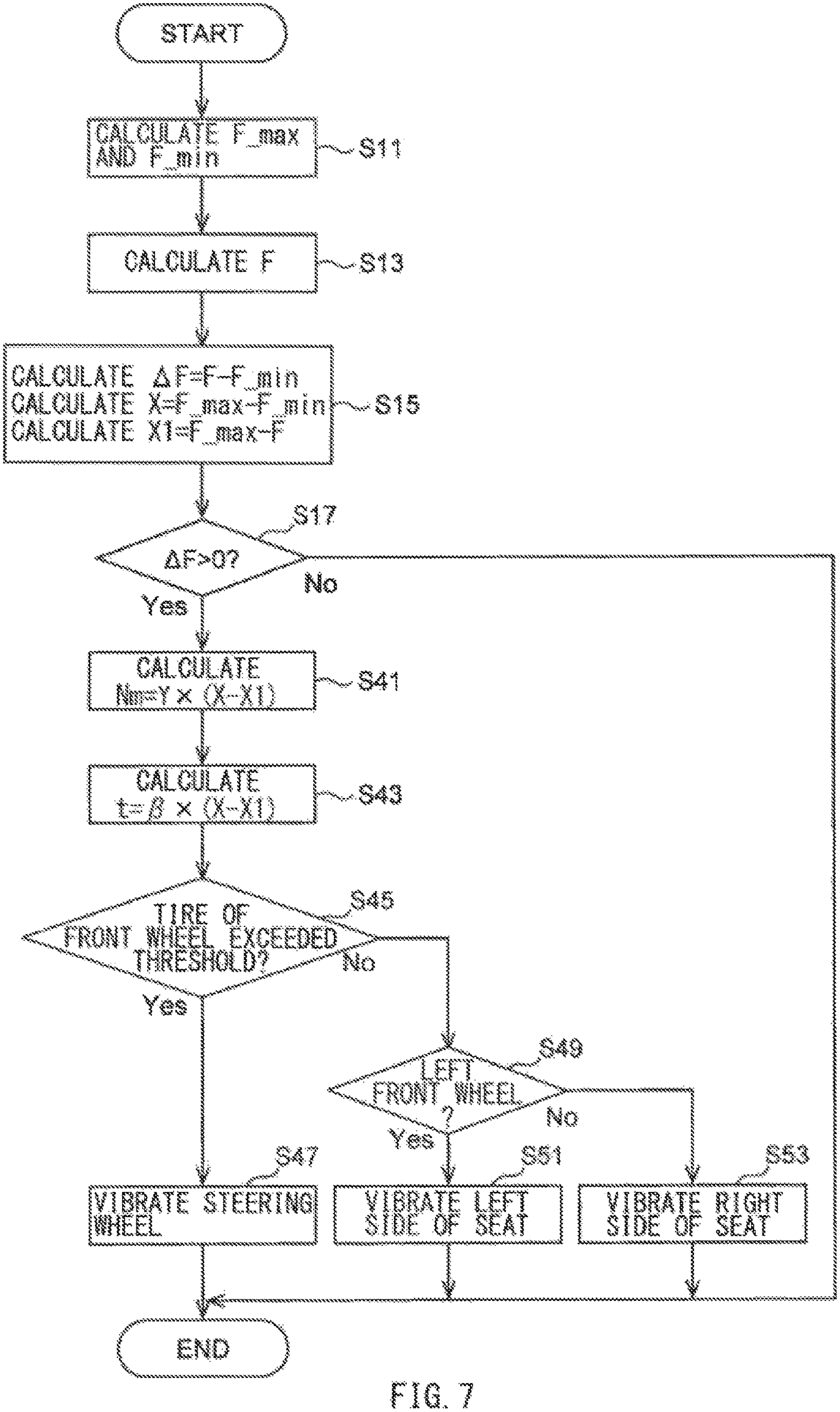
FIG. 7 is a flowchart illustrating a control process executed by a control apparatus for a vehicle according to one example embodiment.

An operation example of an electronic control unit 50 of the control apparatus according to the example will now be described. FIG. 7 is a flowchart illustrating a control process executed by the electronic control unit 50.

A tire-force estimator 51 and a notification unit 53 of the electronic control unit 50 may execute Steps S11 to S17 described above. In Step S17, if the difference ΔF is not a positive value (Step S17: No), the electronic control unit 50 may cause the main routine to end and the procedure to return to Step S11.

If the difference ΔF is a positive value (Step S17: Yes), the notification unit 53 may calculate the output or rotating speed Nm of the eccentric motor of each of the oscillators 73*c*, 73*a*, and 73*b* by multiplying the difference between the differences X and X1 with a predetermined factor γ (Step S41). In Step S41, the rotating speed Nm may increase as the tire force F approaches the tire-force limit value F_max. By using the difference between the differences X and X1, it is possible to appropriately control the rotating speed Nm even when the tire-force limit value F_max varies depending on the condition of the surface of the traveling road.

The notification unit 53 then may calculate the intervals t of the periods during which vibration is generated by multiplying the difference X with a predetermined factor β (Step S43). For example, in Step S43, the intervals t of the vibration periods may decrease as the tire force F approaches the tire-force limit value F_max. By using the difference X, it is possible to appropriately establish the intervals t of the vibration periods even when the tire-force limit value F_max varies depending on the condition of the surface of the traveling road.

Note that the intervals t of the vibration periods may be varied by varying the lengths of the intermittent vibration periods, by varying the length of the non-vibration periods between intermittent vibration periods, or by varying the lengths of both the vibration periods and the non-vibration periods. The notification unit 53 may vary the intensity of the vibration in accordance with the level of the limit state of a wheel 3 in place of or in addition to varying of the intervals of the vibration periods.

The notification unit 53 then may determine whether the wheels 3 in which the tire force F has exceeded the warning start threshold F_min (ΔF>0) is a front wheel (Step S45). If the wheel 3 in which the tire force F has exceeded the warning start threshold F_min is a front wheel (Step S45: Yes), the notification unit 53 may operate the first oscillator 73*c* in accordance with the rotating speed Nm determined in Step S41 and the intervals t determined in Step S43, to vibrate the steering wheel 5 (Step S47).

In Step S45, if the wheel 3 in which the tire force F has exceeded the warning start threshold F_min is not a front wheel (Step S45: No), the notification unit 53 may determine whether the wheel 3 is the left rear wheel (Step S49).

If the wheel 3 in which the tire force F has exceeded the warning start threshold F_min is the left rear wheel (Step S49: Yes), the notification unit 53 may operate the second oscillator 73*a* in accordance with the rotating speed Nm determined in Step S41 and the intervals t determined in Step S43, to vibrate the left side of a back part 43 of the seat 40 (Step S51). If the wheel 3 in which the tire force F has exceeded the warning start threshold F_min is not the left rear wheel (Step S49: No), the notification unit 53 may operate the third oscillator 73*b* in accordance with the rotating speed Nm determined in Step S41 and the intervals t determined in Step S43, to vibrate the right side of the back part 43 of the seat 40 (Step S53).

In this way, the control apparatus for the vehicle according to the embodiment enables the driver to perceive, in a short time, the position of the tire in which the tire force is approaching a limit. For example, when the tire force F of the left front wheel 3LF or the right front wheel 3RF exceeds the warning start threshold F_min, vibration may be transmitted to the driver via the steering wheel 5. When the tire force F of the left rear wheel 3LR or the right rear wheel 3RR exceeds the warning start threshold F_min, vibration may be transmitted from the left or right side of the back part 43 of the seat 40 to the driver. Thus, the driver may be able to immediately perceive, through tactile perception, the presence of a wheel 3 approaching a slipping limit and the position of the wheel 3. In particular, in situations in which quick maneuvering is required, such as during sport driving, the driver may be able to immediately or intuitively perceive, through vibration, the position of the tire in which the tire force is approaching a limit. Thus, it is possible to reduce the idle time that elapses before the driver perceives the presence of a wheel 3 approaching a slipping limit and the position of the wheel 3. In this way, the possibility of slipping is reduced.

Note that in the embodiment described above, the driver may be informed about the tire force F exceeding the warning start threshold F_min in any one of the front wheels 3, the left rear wheel 3, and the right rear wheel 3. Alternatively, the driver may be informed about the tire force F exceeding the warning start threshold F_min in either a front wheel or a rear wheel. In such a case, the second oscillator 73*a* and the third oscillator 73*b* buried in the seat 40 may be operated to generate vibration when the tire force F exceeds the warning start threshold F_min in either the left rear wheel 3LR or the right rear wheel 3RR.

OTHER EMBODIMENTS

The control apparatus for a vehicle according to the first and second embodiments have been described above. The embodiments may be modified in various ways. For example, the driver may be warned through the use of light, heat, and ultrasonic waves besides sound and vibration.

In the case where light is used to warn the driver, the electronic control unit 50 may execute a warning generation process according to, for example, the flow chart illustrated in FIG. 4 in the first embodiment. In such a case, the notification unit 53 may turn on a light source selected among light sources disposed at different positions and/or vary the wavelength or color of the emitted light depending on the position of the wheel 3 in which the tire force F has exceeded the warning start threshold, for example. Alternatively, the notification unit 53 may increase the intensity of the light or shorten the intervals of light emission as the tire force approaches the tire-force limit value.

In the case where ultrasonic waves are used to warn the driver, the electronic control unit 50 may, for example, use ultrahaptics technology and execute a warning generation process according to the flow chart illustrated in FIG. 4 in the first embodiment.

Figure 8:
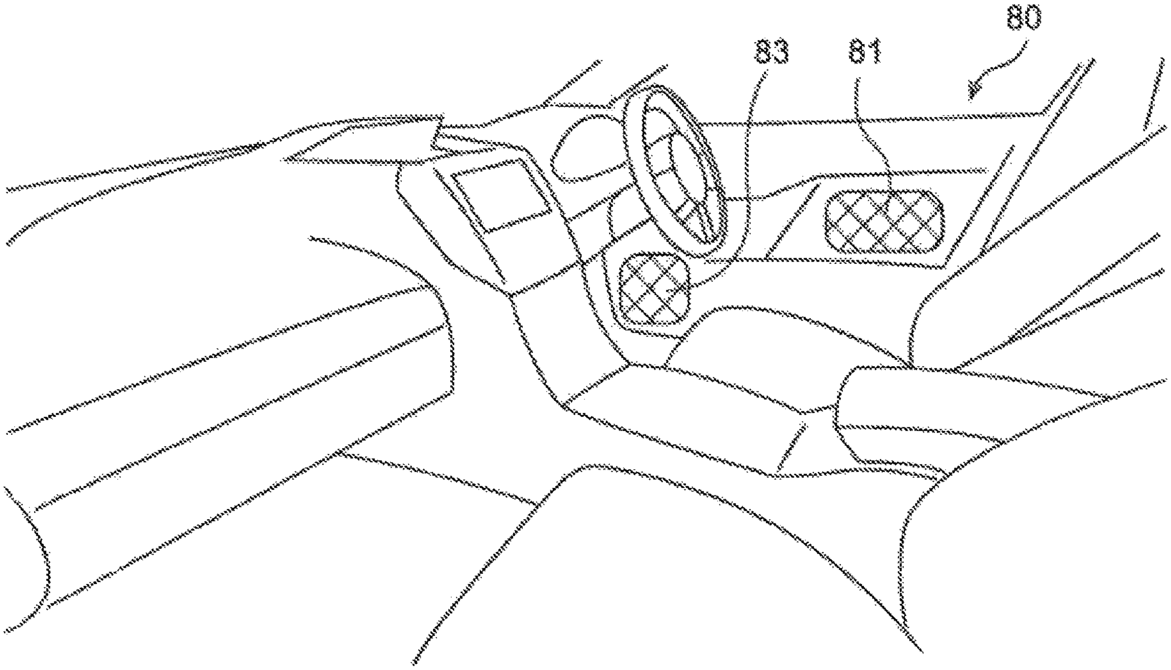
FIG. 8 illustrates a configuration example of a control apparatus for a vehicle according to one example embodiment of the technology.

FIG. 8 illustrates an example of an ultrasonic haptic system. FIG. 8 illustrates a first ultrasonic transducer 81 and a second ultrasonic transducer 82, which serve as oscillators.

The first ultrasonic transducer 81 and the second ultrasonic transducer 82 may be installed in the front door 80 on the driver's seat side. The first ultrasonic transducer 81 may be installed in the upper rear portion of the front door 80. The second ultrasonic transducer 82 may be installed in the lower front portion of the front door 80. The first ultrasonic transducer 81 may operate in response to the tire force of at least one of the left front wheel 3LF or the right front wheel 3RF exceeding a warning start threshold. The first ultrasonic transducer 81 may provide a sense of touch to mainly the upper body of the driver. The second ultrasonic transducer 83 may operate in response to the tire force of at least one of the left rear wheel 3LR and the right rear wheel 3RR exceeding a warning start threshold. The second ultrasonic transducer 83 may provide a sense of touch to mainly the lower body of the driver.

The basic configuration of the vehicle may be the same as that of the vehicle illustrated in FIG. 1, except for the oscillators. Thus, detailed descriptions of the configuration will not be repeated here. Note that the ultrasonic transducers may be installed in any position, and the ultrahaptics system may provide a sense of touch to any part of the body.

In the case where heat is used to warn the driver, the electronic control unit 50 may, for example, execute a warning generation process according to the flow chart illustrated in FIG. 7 in the second embodiment. In such a case, the notification unit 53 may turn on a heater among heaters disposed in different position depending on the position of the wheel 3 in which the tire force F has exceeded the warning start threshold. Alternatively, the notification unit 53 may vary the intensity or the temperature of the heat as the tire force approaches the tire-force limit value.

In this way, the electronic control unit of a vehicle may inform the driver about the position of a wheel 3 in which the tire force F of the wheel 3 has exceeded the warning start threshold F_min through ways besides the use of sound and vibration. Thus, the driver may be able to immediately perceive, through visual and tactile perception, the presence of a wheel 3 approaching a slipping limit and the position of the wheel 3. In particular, in situations in which quick maneuvering is required, such as during sport driving, the driver may be able to immediately or intuitively perceive, through visual and tactile perception, the position of the tire in which the tire force is approaching a limit. Thus, it is possible to reduce the idle time that elapses before the driver perceives the presence of a wheel 3 approaching a slipping limit and the position of the wheel 3. In this way, the possibility of slipping is reduced.

One or both of the tire-force estimator 51 and the notification unit 53 in the electronic control unit 50 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the tire-force estimator 51 and the notification unit 53. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the tire-force estimator 51 and the notification unit 53 in the electronic control unit 50 illustrated in FIG. 1.

Some embodiments of the technology have been described in detail with reference to the accompanying drawings. Note that the description above is not to be construed as limiting to the technology. Although some example configurations, example processing and modification examples according to an embodiment of the technology are described hereinabove, the foregoing embodiments are mere examples and are not intended to limit the scope of the technology. It should be also appreciated that various omissions, replacements, and modifications may be made in the foregoing embodiments described herein, without departing from the scope of the spirit of the technology. The technology is intended to include such modifications and alterations in so far as they fall within the scope of the appended claims or the equivalents thereof.

According to the embodiments and modification examples of the technology described above, the driver may be able to perceive, in a short time, the position of the tire in which the tire force is approaching the limit.

The invention claimed is:

1. A control apparatus for a vehicle, the control apparatus comprising:

tire-force sensors provided on respective wheels of the vehicle;

a tire-force estimator configured to estimate tire forces of the respective wheels on a basis of sensor signals outputted from the respective tire-force sensors, each of the tire forces being a combined force of a front-rear force component and a lateral force component, the front-rear force component being a component of a frictional force generated at a ground contact face of a tire provided on a respective wheel of the respective wheels in a direction parallel to a central plane of the respective wheel of the respective wheels, the lateral force component being a component of the frictional force generated in a direction orthogonal to the central plane of the respective wheel of the respective wheels; and a notification unit configured to:

determine a first threshold on a basis of a friction coefficient between the ground contact faces and the tires of the respective wheels so that each of the respective wheels is not in a slip state while the each of the tire forces is less than or equal to the first threshold;

determine a second threshold on a basis of the friction coefficient, the second threshold being less than the first threshold and indicating a limit state of possible slipping of the tires of the respective wheels;

compare the estimated tire forces of the respective wheels with the second threshold;

determine a wheel of the respective wheels being in the limit state in response to a corresponding estimated tire force of the wheel of the respective wheels exceeding the second threshold;

in response to determining that the wheel of the respective wheels is in the limit state, determine a level of the limit state of the wheel by subtracting the second threshold from the estimated tire force of the wheel in the limit state;

generate a directional warning based on the determined level of the limit state of the wheel in the limit state, in at least one form of the following to spatially indicate a position of the wheel in the limit state relative to a driver's position in the vehicle, wherein the directional warning is generated from a location in the vehicle corresponding to a direction of the wheel in the limit state relative to the driver's position such that the driver perceives the position of the wheel in the limit state through a direction from which the directional warning is received by the driver, and one or both of an intensity or an interval of the directional warning is progressively changed in proportion to the determined level of the limit state of the wheel in the limit state:

changing a type of a sound in accordance with a position of the wheel in the limit state, or changing a radiating position of heat in accordance with the position of the wheel in the limit state; and inform the driver of the vehicle about the position of the wheel in the limit state through the generated directional warning.

2. The control apparatus according to claim 1, wherein the wheels comprise a front wheel and a rear wheel, and the notification unit is configured to inform the driver about whether the wheel in the limit state is the front wheel or the rear wheel.

3. The control apparatus according to claim 1, wherein the wheels comprise a left wheel and a right wheel, and the notification unit is configured to inform the driver about whether the wheel in the limit state is the left wheel or the right wheel.

4. The control apparatus according to claim 1, wherein the notification unit is configured to change a position of emitting a light or a wavelength of the light in accordance with the position of the wheel in the limit state.

5. The control apparatus according to claim 1, wherein the notification unit is configured to change a generating position of vibration in accordance with the position of the wheel in the limit state.

6. The control apparatus according to claim 1, further comprising a front speaker located in the vehicle and a rear speaker located rearward than the front speaker in the vehicle, wherein the wheels comprise a front wheel and a rear wheel, and wherein the notification unit is configured to:

in response to the determining that the respective wheels include the wheel in the limit state, determine whether the wheel in the limit state is the front wheel;

in response to determining that the wheel in the limit state is the front wheel, cause the front speaker to generate a warning sound; and in response to determining that the wheel in the limit state is not the front wheel, cause the rear speaker to generate the warning sound.

7. The control apparatus according to claim 6, wherein, the front speaker is located frontward than a seatback of a driving seat of the vehicle, and wherein the rear speaker is located rearward than the seatback of the driving seat.

8. The control apparatus according to claim 1, further comprising a left front speaker, a right front speaker, a left rear speaker and a right rear speaker, the left front speaker being located frontward and leftward than a seatback of a driving seat of the vehicle, the right front speaker being located frontward and rightward than the seatback of the driving seat, the left rear speaker being located rearward and leftward than the seatback of the driving seat, the right rear speaker being located rearward and rightward than the seatback of the driving seat, wherein the wheels comprise a left front wheel, a right front wheel, a left rear wheel and a right rear wheel, wherein the notification unit is configured to:

in response to the determining that the respective wheels include the wheel in the limit state, determine whether the wheel in the limit state is the left front wheel, the right front wheel, the left rear wheel and the right rear wheel;

in response to determining that the wheel in the limit state is the left front wheel, cause the left front speaker to generate a warning sound;

in response to determining that the wheel in the limit state is the right front wheel, cause the right front speaker to generate the warning sound;

in response to determining that the wheel in the limit state is the left rear wheel, cause the left rear speaker to generate the warning sound; and in response to determining that the wheel in the limit state is the right rear wheel, cause the right rear speaker to generate the warning sound.

9. The control apparatus according to claim 1, further comprising a first oscillator located in the vehicle and a second oscillator located rearward than the first oscillator in the vehicle, wherein the wheels comprise a front wheel and a rear wheel, and wherein the notification unit is configured to:

in response to the determining that the respective wheels include the wheel in the limit state, determine whether the wheel in the limit state is the front wheel;

in response to determining that the wheel in the limit state is the front wheel, operate the first oscillator; and in response to determining that the wheel in the limit state is not the front wheel, operate the second oscillator.

10. The control apparatus according to claim 9, wherein, the first oscillator is configured to vibrate a steering wheel of the vehicle when the first oscillator is operated, and wherein the second oscillator is disposed on a driving seat of the vehicle.

11. The control apparatus according to claim 1, further comprising a front oscillator, a left oscillator and a right oscillator, the front oscillator being fixed to a steering column of the vehicle, the left oscillator being disposed in a driving seat of the vehicle, the right oscillator being disposed rightward than the left oscillator in the driving seat, wherein the wheels comprise a left front wheel, a right front wheel, a left rear wheel and a right rear wheel, wherein the notification unit is configured to:

in response to the determining that the respective wheels include the wheel in the limit state, determine whether the wheel in the limit state is the left front wheel, the right front wheel, the left rear wheel and the right rear wheel;

in response to determining that the wheel in the limit state is the left front wheel or the right front wheel, operate the front oscillator;

in response to determining that the wheel in the limit state is the left rear wheel, operate the left oscillator; and in response to determining that the wheel in the limit state is the right rear wheel, operate the right oscillator.

12. A control apparatus for a vehicle, the control apparatus comprising:

tire-force sensors provided on respective wheels of the vehicle; and circuitry configured to:

estimate tire forces of the respective wheels on a basis of sensor signals outputted from the respective tire-force sensors, each of the tire forces being a combined force of a front-rear force component and a lateral force component, the front-rear force component being a component of a frictional force generated at a ground contact face of a tire provided on a respective wheel of the respective wheels in a direction parallel to a central plane of the respective wheel of the respective wheels, the lateral force component being a component of the frictional force generated in a direction orthogonal to the central plane of the respective wheel of the respective wheels; and determine a first threshold on a basis of a friction coefficient between the ground contact faces and the tire of the respective wheels so that each of the respective wheels is not in a slip state while the each of the tire forces is less than or equal to the first threshold;

determine a second threshold on a basis of the friction coefficient, the second threshold being less than the first threshold and indicating a limit state of possible slipping of the tires of the respective wheels;

compare the estimated tire forces of the respective wheels with the second threshold;

determine a wheel of the respective wheels being in a limit state in response to a corresponding estimated tire force of the wheel of the respective wheels exceeding the second threshold;

in response to determining that the wheel of the respective wheels is in the limit state, determine a level of the limit state of the wheel by subtracting the second threshold from the estimated tire force of the wheel in the limit state;

generate a directional warning based on the determined level of the limit state of the wheel in the limit state, in at least one form of the following to spatially indicate a position of the wheel in the limit state relative to a driver's position in the vehicle, wherein the directional warning is generated from a location in the vehicle corresponding to a direction of the wheel in the limit state relative to the driver's position such that the driver perceives the position of the wheel in the limit state through a direction from which the directional warning is received by the driver, and one or both of an intensity or an interval of the directional warning is progressively changed in proportion to the determined level of the limit state of the wheel in the limit state:

changing a type of a sound in accordance with a position of the wheel in the limit state, or changing a radiating position of heat in accordance with the position of the wheel in the limit state; and inform the driver of the vehicle about the position of the wheel in the limit state through the generated directional warning.

13. A control apparatus for a vehicle, the control apparatus comprising:

tire-force sensors provided on respective wheels of the vehicle;

heaters provided at different positions in the vehicle; and circuitry configured to:

estimate tire forces of the respective wheels on a basis of sensor signals outputted from the respective tire-force sensors, each of the tire forces being a combined force of a front-rear force component and a lateral force component, the front-rear force component being a component of a frictional force generated at a ground contact face of a tire provided on a respective wheel of the respective wheels in a direction parallel to a central plane of the respective wheel of the respective wheels, the lateral force component being a component of the frictional force generated in a direction orthogonal to the central plane of the respective wheel of the respective wheels;

determine a first threshold on a basis of a friction coefficient between the ground contact faces and the tires of the respective wheels so that each of the respective wheels is not in a slip state while the each of the tire forces is less than or equal to the first threshold;

determine a second threshold on a basis of the friction coefficient, the second threshold being less than the first threshold and indicating a limit state of possible slipping of the tires of the respective wheels;

compare the estimated tire forces of the respective wheels with the second threshold;

determine a wheel of the respective wheels being in a limit state in response to a corresponding estimated tire force of the wheel of the respective wheels exceeding the second threshold;

in response to determining that the wheel of the respective wheels is in the limit state, determine a level of the limit state of the wheel by subtracting the second threshold from the estimated tire force of the wheel in the limit state; and control a turning on of a heater among the heaters to inform a driver of the vehicle about a position of the wheel in the limit state on a basis of the determined level of the limit state of the wheel in the limit state, a location of the heater indicating a direction of the position of the wheel in the limit state relative to the driver's position in the vehicle, such that the driver perceives the position of the wheel in the limit state through a direction from which heat generated by the heater is received by the driver, one or both of an intensity or an interval of a heat generated by the heater being progressively changed in proportion to the determined level of the limit state of the wheel in the limit state.

* * * * *